(12) United States Patent
Anderson (10) Patent No.: US 9,499,126 B2
(45) Date of Patent: *Nov. 22, 2016

(54) SECURITY SYSTEM AND METHOD USING MOBILE-TELEPHONE TECHNOLOGY

(75) Inventor: Micah Paul Anderson, Roscoe, IL (US)

(73) Assignee: J & CP INVESTMENTS LLC, Roscoe, IL (US), part interest ( * ) Notice: Subject to any disclaimer, the term of this patent is extended or adjusted under 35 U.S.C. 154(b) by 219 days.

This patent is subject to a terminal disclaimer.

(21) Appl. No.: 13/507,409

(22) Filed: Jun. 26, 2012

(65) Prior Publication Data

US 2012/0268267 A1    Oct. 25, 2012

Related U.S. Application Data

(63) Continuation-in-part of application No. 11/834,375, filed on Aug. 6, 2007.

(60) Provisional application No. 60/835,666, filed on Aug. 4, 2006, provisional application No. 60/923,144, filed on Apr. 12, 2007.

(51) Int. Cl.
| | |
|---|---|
| *G08B 1/08* | (2006.01) |
| *B60R 25/10* | (2013.01) |
| *B60R 25/102* | (2013.01) |
| *B60R 25/30* | (2013.01) |
| *B60R 25/33* | (2013.01) |
| *G08B 25/00* | (2006.01) |
| *G08B 27/00* | (2006.01) |

(52) U.S. Cl.
CPC ......... *B60R 25/1004* (2013.01); *B60R 25/102* (2013.01); *B60R 25/305* (2013.01); *B60R 25/33* (2013.01); *G08B 25/001* (2013.01); *G08B 27/006* (2013.01); *B60R 2325/205* (2013.01)

(58) Field of Classification Search
CPC .... G08B 23/00; G08B 27/00; G08B 27/001; G08B 21/00; G08B 19/00; G08B 27/006; G08B 13/00; G08B 21/10; G08B 21/12; G08B 25/001; G01C 21/34; B60Q 1/00; B60R 16/037; B60R 25/1004; B60R 25/102; B60R 25/305; B60R 25/33
USPC .............................................. 340/539.26, 541
See application file for complete search history.

(56) References Cited

U.S. PATENT DOCUMENTS

| | | |
|---|---|---|
| 6,278,884 B1 | 8/2001 | Kim |
| 6,433,683 B1 | 8/2002 | Robinson |
| 6,441,731 B1 | 8/2002 | Hess |
| 6,577,234 B1 | 6/2003 | Dohrmann |

(Continued)

*Primary Examiner* — Kerri McNally
(74) *Attorney, Agent, or Firm* — David J. Archer (57) ABSTRACT

Disclosed is a security and alarm system. When sensors detect something of note, they alert a master unit which in turn captures pertinent information (e.g., an image or sound) and sends the alert and the captured information. The recipient of the alert (for example, an owner of the system or a security service) evaluates the information and takes appropriate action such as alerting a local police department. Some embodiments offer two-way service: In addition to delivering alerts, the system responds to alerts from an authorized user requesting current information. Two-way communications allow some embodiments to deliver "Breach of Peace" alerts to users. In one scenario, a public security service sends out a warning within a geographical area that the peace has been breached. The system receives the warning and alerts its user to the situation. The user can then take appropriate action.

12 Claims, 8 Drawing Sheets

(56) References Cited

U.S. PATENT DOCUMENTS

| | | |
|---|---|---|
| 7,027,808 B2 | 4/2006 | Wesby |
| 7,035,650 B1* | 4/2006 | Moskowitz et al. ....... 455/456.5 |
| 7,123,126 B2 | 10/2006 | Tanaka |
| 7,129,838 B2 | 10/2006 | Shimomura |
| 7,190,263 B2 | 3/2007 | McKay |
| 7,206,645 B2 | 4/2007 | Seguin |
| 7,411,496 B2 | 8/2008 | Sharpe |
| 2003/0227377 A1 | 12/2003 | Cardenas |
| 2004/0212500 A1 | 10/2004 | Stilp |
| 2006/0087411 A1 | 4/2006 | Chang |
| 2007/0139190 A1 | 6/2007 | Tanner |
| 2008/0055097 A1* | 3/2008 | Chidakel et al. ............. 340/628 |
| 2010/0109866 A1 | 5/2010 | Gavrila |
| 2010/0149335 A1* | 6/2010 | Miller, II ...................... 348/148 |
| 2012/0191488 A1* | 7/2012 | Alperin ............................. 705/5 |

* cited by examiner

SECURITY SYSTEM AND METHOD USING MOBILE-TELEPHONE TECHNOLOGY

CROSS-REFERENCE TO RELATED APPLICATIONS

This application is a continuation-in-part of U.S. Utility patent application Ser. No. 11/834,375, filed on Aug. 6, 2007, and claims priority to that application and to U.S. Provisional Patent Applications 60/835,666, filed on Aug. 4, 2006, and 60/923,144, filed on Apr. 12, 2007, all of which are incorporated herein by reference in their entireties.

FIELD OF THE INVENTION

The present invention is related generally to security systems, and, more particularly, to remote supervisory, control, and alarm systems.

BACKGROUND OF THE INVENTION

In the post-9/11 world, people are very focused on personal and property security. For commercial concerns, an up-to-date security system with a remote-monitoring service has long been considered to be a necessary cost of doing business. Closer to home, most car manufacturers now offer alarm systems, and sales of residential security systems are growing rapidly.

While an entry-level security system may only sound a siren or flash a light when an untoward condition is detected, more sophisticated (and more expensive) systems respond by alerting a private security service. (As used in this patent application, "security services" include private alarm-monitoring companies and public organizations such as the police, fire departments, and 911 call centers.) The private security service investigates the situation and, depending upon the results of the investigation, may in turn alert a public security service.

In a separate but related aspect of security, parents wish to monitor and possibly to control remotely the activities of their children to assure themselves that their children are neither walking into trouble nor having trouble thrust upon them. Some parents, for example, give their children cellphones so that the parents can always contact the children and so that the children can call in case of an emergency. The security systems of some vehicles allow parents to limit the speed at which a child (or a parking valet) can operate the vehicle.

The spread of security systems, however, is limited because existing systems are either very expensive to buy and to maintain (high-end systems) or can be disabled by ingenious criminals (low-end systems).

BRIEF SUMMARY OF THE INVENTION

The above problems and shortcomings, and others, are addressed by the present invention, which can be understood by referring to the specification, drawings, and claims. According to aspects of the present invention, radio technology (e.g., cellular, satellite, WiFi, Bluetooth) is used to provide a reliable security and alarm system. In some embodiments, two-way communications are used to deliver "Breach of Peace" and other alerts to users. In one scenario, a public security service sends out a warning to personal communications devices within a geographical area that the peace has been breached (for example, a criminal has escaped, a terrorist attack is contemplated, or a river is flooding). The devices receive the warning and alert their users to the situation. The users can then take appropriate action.

In some embodiments, users register their devices to receive alerts. For example, all students and employees at a school can be registered. Users can also register for particular types of alerts. For example, everyone would register for Breach of Peace alerts, while only some would register for high-pollen-count alerts. As appropriate, alerts are then sent to the registered users.

In some embodiments, alerts can also be delivered even to users who are not registered to receive them. In these embodiments, users (or their personal communications devices) are detected entering an area (such as a school campus or commercial building). When necessary, the Breach of Peace alert is then sent to registered users and also to those unregistered devices detected in the area of concern. Alerts can also be sent to appropriate security personnel.

The alerts can include, in addition to a text message describing the current incident, maps or other information that allow regular users to avoid the trouble and that allow security personnel to respond quickly to the trouble.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Figure 1A:
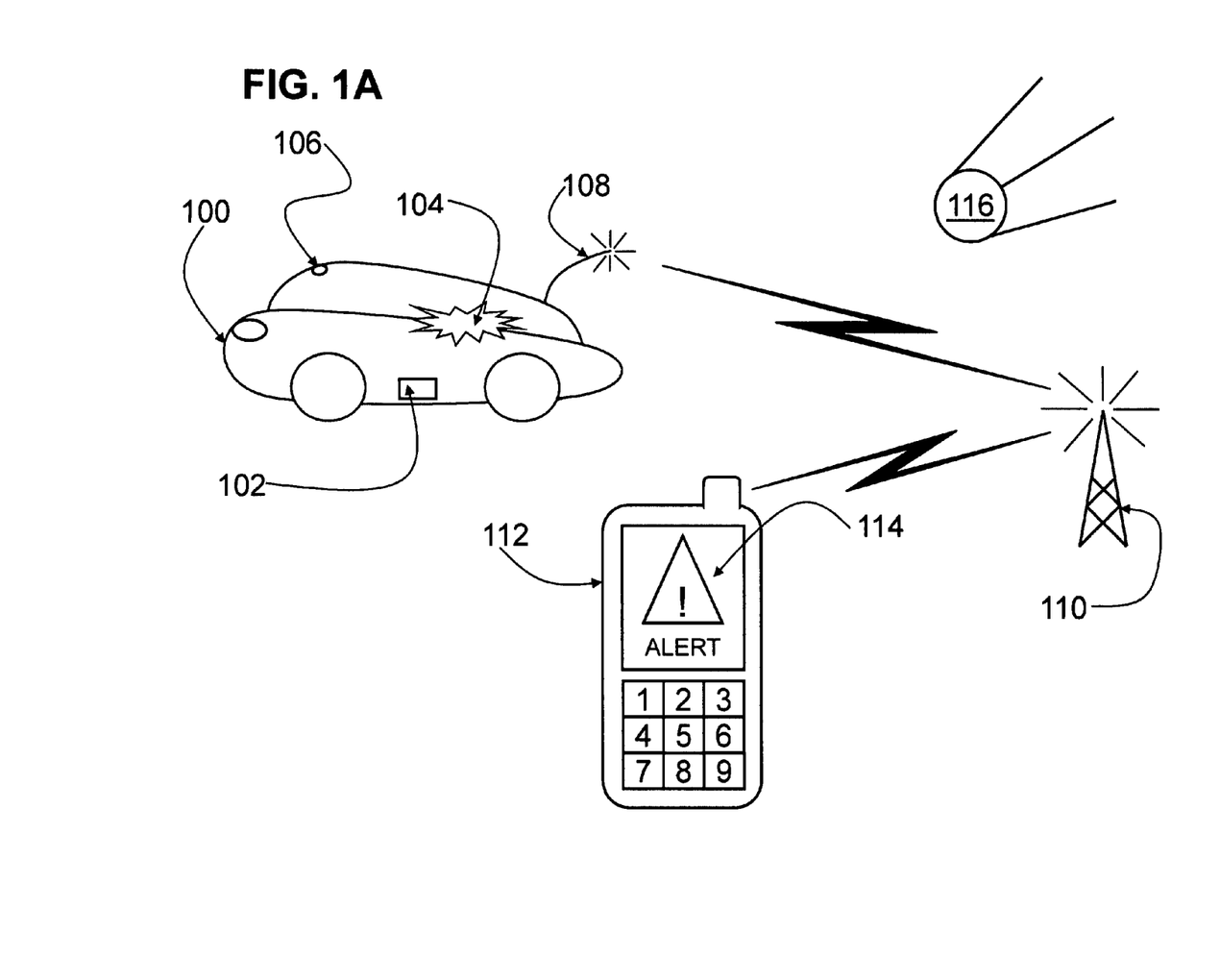
FIG. 1A is a block diagram of a security system installed in an automobile according to one embodiment of the present invention.

FIG. 1A presents a vehicle-security system as one exemplary embodiment of some aspects of the present invention. The security system integrated into a vehicle 100 includes a master control unit 102. Connected to the master control unit 102 are alarm and status sensors 104. Also connected to the master control unit 102 are one or more information-capture devices 106 and a mobile-telephone communications capability, illustrated in FIG. 1A by the antenna 108.

In the most basic mode of operation of the security system, when an alarm sensor 104 "triggers" (e.g., a smoke detector detects smoke), it sends an alert signal to the master control unit 102. In a very primitive embodiment, the master control unit 102 is only informed that a sensor 104 has triggered, but in a preferred embodiment, the master control unit 102 is informed of the specific nature of the alert. If the triggering sensor 104 is so equipped, it can provide a detailed analysis of the alert to the master control unit 102.

The master control unit 102 can choose to collect further information that may be of use in reporting and resolving the alert incident. If, for example, the alert indicates that someone has broken into the vehicle 100, then the master control unit 102 can ask a camera 106 to take a photograph of the driver's position in the vehicle 100.

The alert information and any further information provided by the information-capture devices 106 are then packaged and transmitted using the mobile-telephone capability 108. The master control unit 102 uses stored contact information to direct the transmission of the packaged alert. In FIG. 1A, a telephone call is placed over the cellular-telephone network 110 to a cellphone 112 owned by a registered owner of the vehicle 100. The recipient cellphone 112 displays an alert 114 to its owner.

Upon receiving the alert 114, the owner may simply acknowledge receipt in a communications back to the master control unit 102. In an emergency situation, the owner may choose instead to forward the alert to a private or public security service equipped to respond to the situation. Any information provided by the information-capture devices 106 is sent along to assist the security service.

The security system of FIG. 1A is compatible with any type of alarm or status sensor 104. Typical are sensors for motion, vibration, window breakage, smoke, fire, entry, power-interrupt to the master control unit 102, low tire pressure, and even police radar. Also possible are a physical location sensor (using a GPS receiver) and a maintenance-status indicator alerting the owner that the vehicle 100 is due for scheduled or non-scheduled maintenance.

Similarly, the security system of FIG. 1A is compatible with any type of information-capture device 106. Still and video cameras and microphones are expected to be very common. Because a GPS device can be queried for geographic location, it is clear that some devices can be considered to be both sensors 104 and information-capture devices 106: The line between the two is easily blurred.

The communications between the security system and the end user can be carried, e.g., via a cellular-telephone call, over the Short-Messaging Service, as a text message, or over a satellite link 116. For added security, if a first attempt to transmit the alert over the cellular network 110 fails, then the security system can use the satellite network 116 as a backup.

While FIG. 1A shows the alert first going to an owner's cellphone 112, the master control unit 102 can be flexibly programmed. It may, for example, attempt to contact the owner's cellphone 112, but if the call is not answered (or if a text message is not acknowledged) in a set period of time, then a secondary entity, such as a private or public security service, can be notified. If the alert is not urgent (e.g., maintenance should be performed in the next 1000 or so miles), then the alert can be sent to an e-mail address. As illustrated by this example, different actions can be taken for different alerts: An e-mail or voice-mail suffices for some alerts, while a more urgent alert should be quickly escalated.

Privacy and message security are important considerations in any remote security system. In some embodiments, and for at least some alerts, the holder of the cellphone 112 must authenticate himself before he can view the alert 114. Typical known authentication technologies that can be used are based on entering a PIN, on recognizing a voice or other human-parametric data (e.g., a thumbprint), or on reading the owner's RFID chip.

Figure 1B:
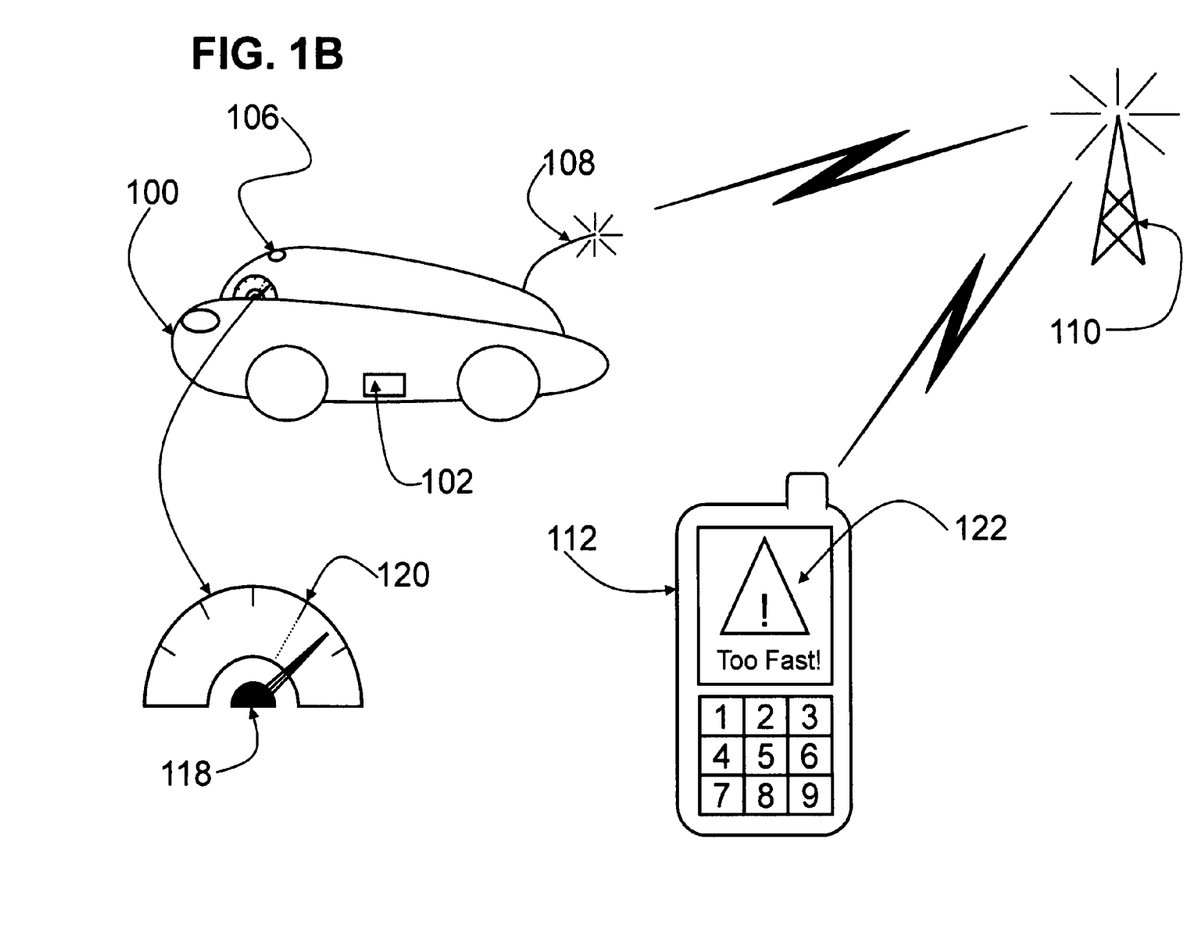
FIG. 1B is a variant of FIG. 1A showing how the security system also supports parental monitoring.

The security system of FIG. 1B is the same as that in FIG. 1A but is implementing an additional "parental monitoring" application. In this application, the owner has lent the vehicle 100 to someone else (e.g., the owner's child or a parking valet.) Sensors detect information that is not necessarily indicative of an emergency but that is nonetheless of interest to the owner. In the example illustrated in FIG. 1B, the owner has set a maximum permissible speed 120. When the speedometer 118 registers that the vehicle 100 is exceeding that speed, the security system sends an alert 122 to the owner. The "parent" could also be alerted, for example, if the seatbelts are not properly fastened or if the vehicle 100 departs from a permissible geographic area. Because the master control unit 102 can discriminate among different alert types (as noted above), it would presumably be programmed to never forward "parental monitoring" alerts 122 to a public or private security service. However, these alerts 122 may be recorded. This application also has commercial uses: If the "parent" is a company that owns the vehicle 100 and "lends" it to its professional drivers, then the record of these "parental monitoring" alerts 122 may be used to catch and to reprimand unsafe drivers or, more generously, to show that the company deserves lower insurance rates.

Figure 2:
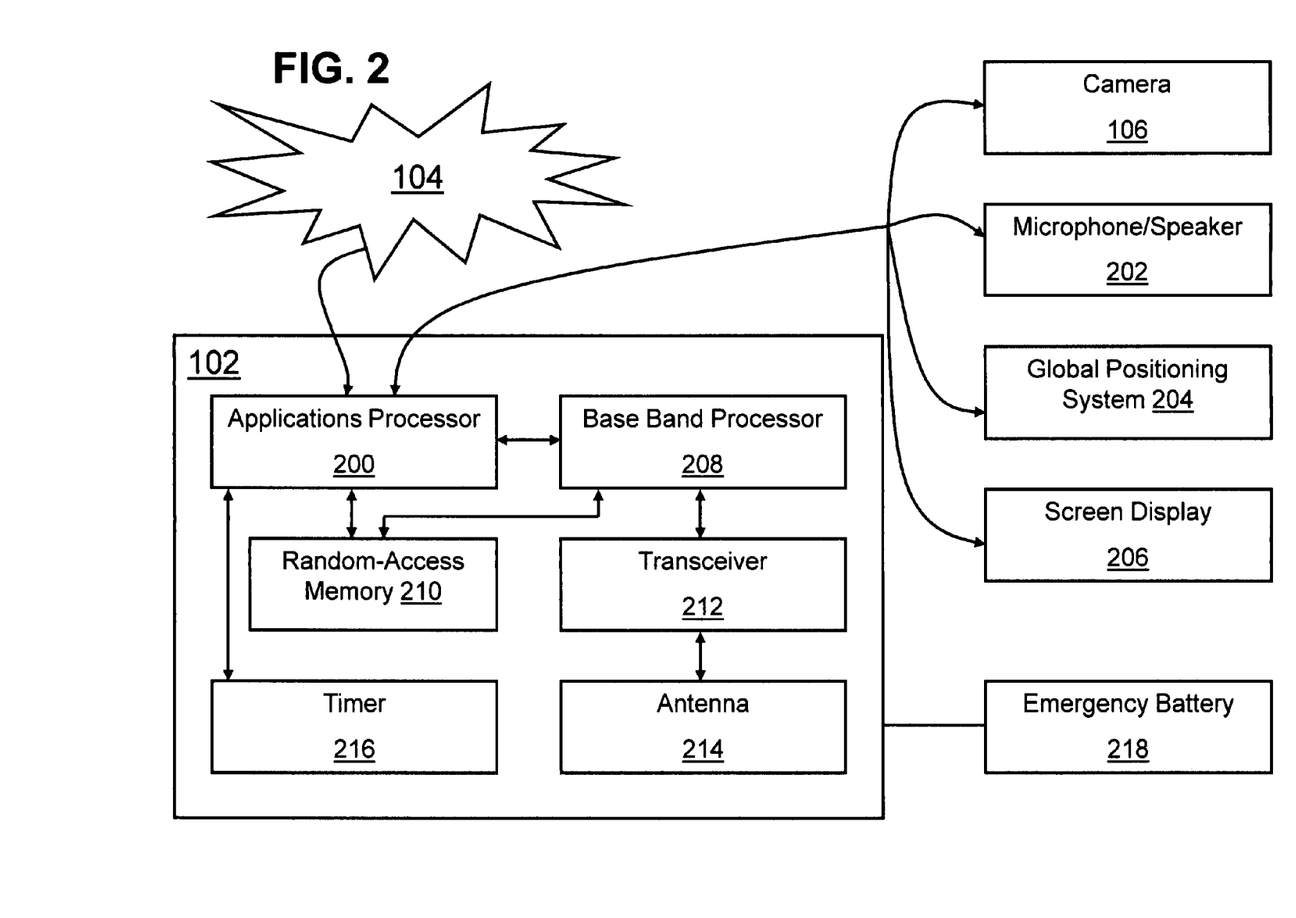
FIG. 2 is a schematic depicting the hardware and software of one embodiment of a security system.

FIG. 2 shows an exemplary hardware configuration for the present invention. An applications processor 200 directs most of the activities of the master control unit 102. It receives alerts from the sensors 104. The communications lines connecting the applications processor 200 and the information-capture devices 106, 202, 204, and 206 are shown with arrows at both ends to illustrate that these devices, at least, receive commands and return captured information. In addition, the master control unit 102 can direct output to some of these devices, such as the speaker 202 and the screen display 206. (This capability is discussed below in reference to FIG. 5.)

The baseband processor 208 handles communications with the outside world. It supports one or more transceivers 212 (e.g., a cellular transceiver and a satellite transceiver) each of which may require its own antenna 214.

The RAM 210 stores configures information such as the primary and second contacts, specific configuration for different alert types (e.g., which alerts are escalated to a security service), and authentication information. As discussed above in reference to FIG. 1A, the recipient of an alert 114 may need to authenticate himself before he is allowed to view the alert 114. (As discussed below in reference to FIG. 5, the security system may also receive commands whose sender must be authenticated before the command is carried out.)

The technologies used to connect the components of the security system are chosen to satisfy the requirements of their particular environment. Wired serial links and USB connections are rugged but are somewhat cumbersome to install. Radio (e.g., Bluetooth) or infrared links are often practical and ease the addition of further sensors 104 and information-capture devices 106. It is preferred that the security system supports the full capabilities of whatever link technologies are used, although tradeoffs between convenience and security should always be considered.

The emergency battery 218 is designed to run the security system for long enough to transmit an alert if local power to the security system is ever disabled. Time is of the essence here because the power interrupt may be caused by a knowledgeable intruder attempting to circumvent the entire security system. Therefore, as soon as the power-interrupt sensor mentioned above in reference to FIG. 1A triggers, the system immediately switches over to draw power from the emergency battery 218. Useful information is captured as quickly as possible, and the alert is transmitted. The security system can be configured to take special action in this case as it might not have the luxury of first contacting the owner: It may need to contact a security service immediately.

The master control unit 102 need not be all of a piece as shown in FIG. 2. In some embodiments, the functional modules are distributed. This makes each piece very small and thus makes detecting and disabling the security system very difficult.

Figure 3:
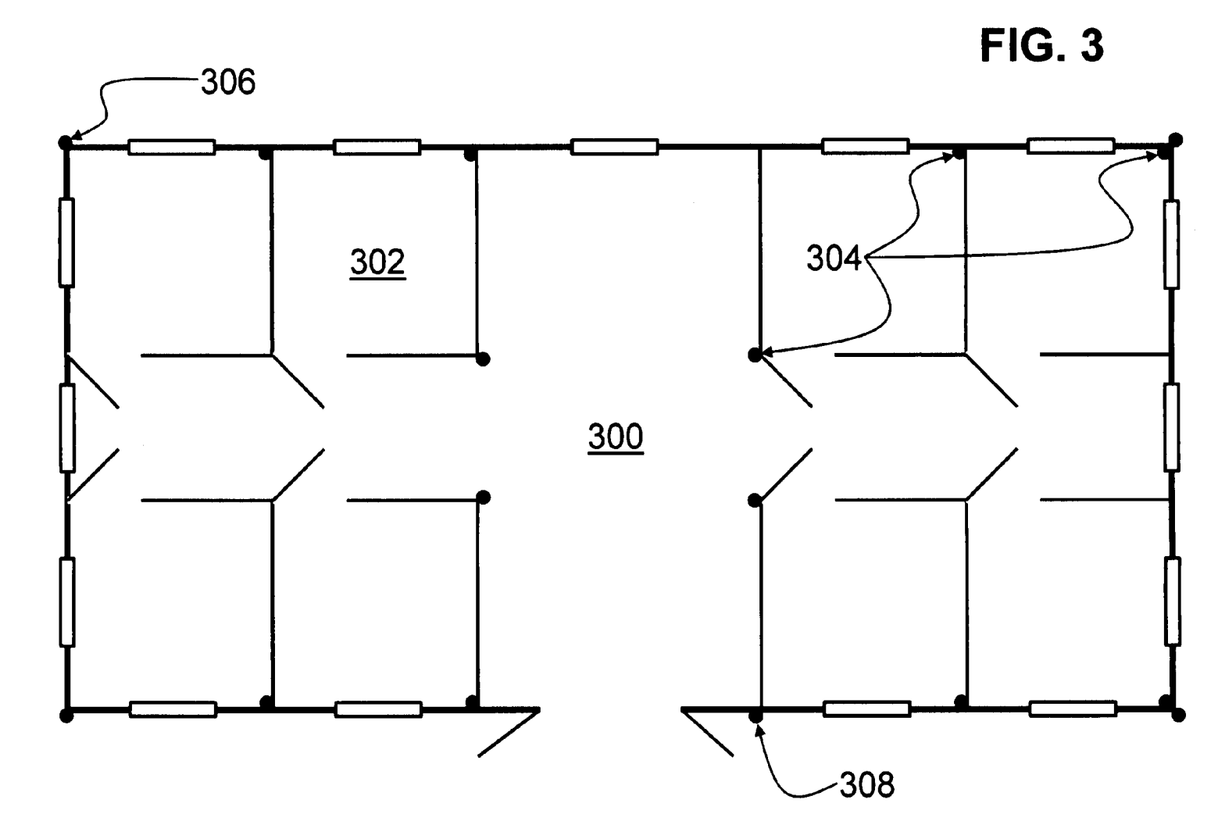
FIG. 3 is a block diagram showing an exemplary installation of a security system in a building, either commercial or domestic.

The security system of the present invention can also be implemented in the building 300 of FIG. 3. Whether commercial or domestic, the building 300 contains rooms 302 and sensors 304 in at least some of the rooms 302. Many of the sensors 304 are of the same type as discussed above in reference to the vehicle 100 of FIGS. 1A and 1B: detectors for smoke, fire, window-breakage, and entry. There may be additional building-specific sensors such as noxious gas detectors. The sensors 304 are often combined with information-capture devices 306 such as cameras and microphones. (An application of decibel sensors in the building 300 is discussed below in reference to FIG. 6.) Sensors and information-capture devices 306 are also placed outside the building 300 to monitor its surroundings. In a secure building environment, an entry sensor 308, such as an RFID reader, controls and records entrance. The entry sensor 308 could also detect Bluetooth-enabled devices when they come in range. Of course, the security system for the building 300 includes at least one master control unit 102 and the accompanying mobile-telephone communications capability 108. In a building environment, it is highly desirable that each transmitted alert indicates the location of the specific sensors and information-capture devices 304, 306 that provide the information for the alert. With this information, security services (e.g., firemen) responding to the alert can know exactly how to proceed without groping around blindly.

Figure 4:
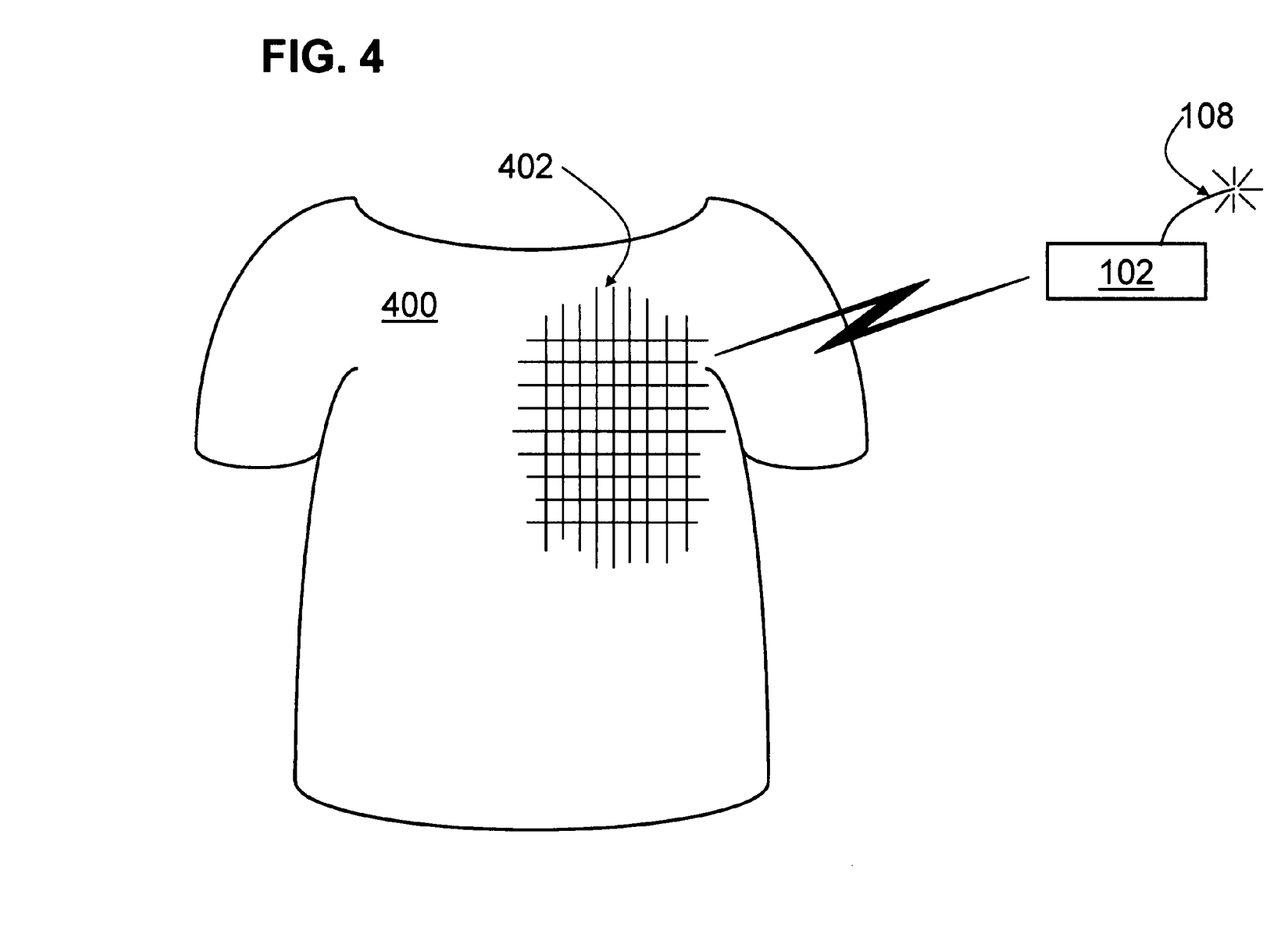
FIG. 4 is a block diagram of an embodiment of the security system that supports health-care monitoring.

The scope of possible applications for the present invention is virtually unlimited. One more example will suffice. In FIG. 4, a network of tiny wires and sensors 402 are woven into a shirt 400. When the shirt is worn, the sensor network 402 reads the wearer's vital medical information, such as pulse rate and blood pressure. The readings are transmitted, for example by Bluetooth, to the master control unit 102 and then transmitted to the contact configured for this type of alert. The master control unit 102 need not be dedicated to this one application, but can work with input from the sensor network 402 just as it works with input from other sensors 104 and information-capture devices 106. In some embodiments of the medical application illustrated in FIG. 4, alerts are sent to emergency medical personnel when the sensors 402 note that the readings are out of the range of safety. Medical information about the wearer, e.g., a list of allergies, can be stored in the RAM 210 of the master control unit 102 and sent along with the alert. In a non-emergency scenario, readings can be periodically taken, transmitted, and recorded. The developing record is useful for diagnosis and for medical studies.

Figure 5:
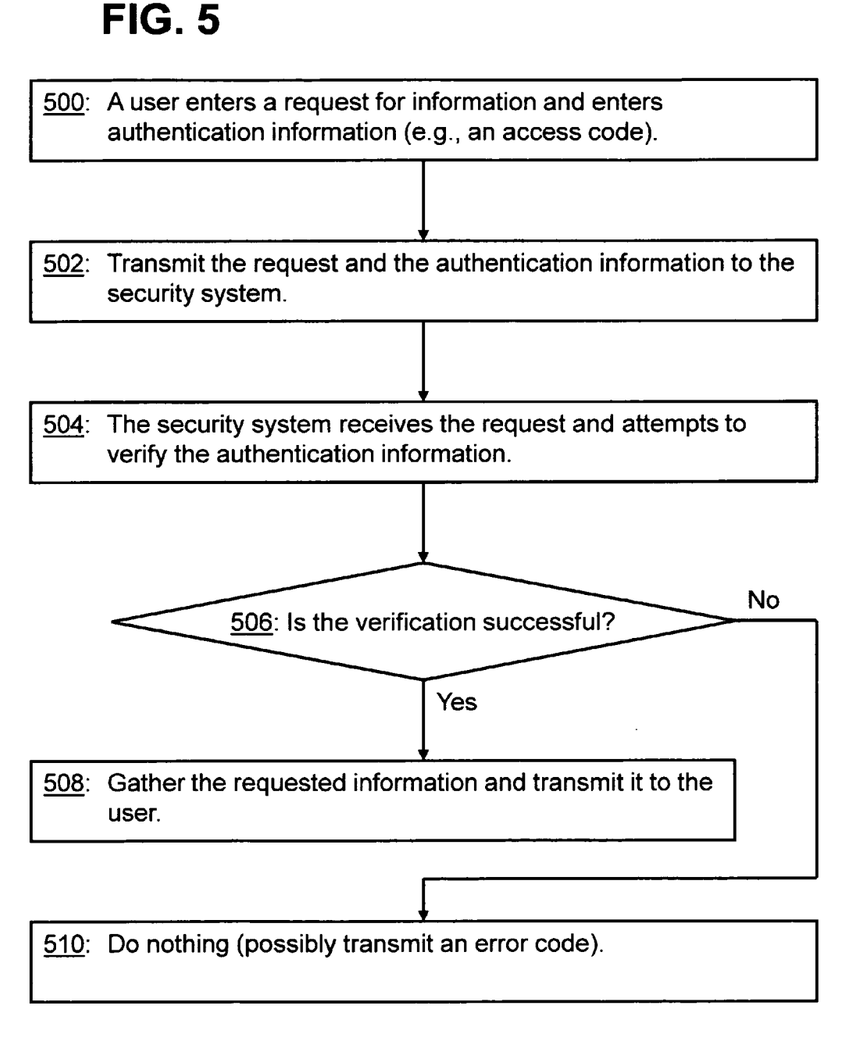
FIG. 5 is a flowchart showing an exemplary method for providing a two-way security system.

FIG. 5 illustrates a feature that is useful in almost any scenario. Here, a registered contact, say the owner of the security system, rather than waiting for the system to send an alert, wishes to proactively query the system for information. Going back to the scenario illustrated in FIG. 1A, the owner uses the cellphone 112 to call (or text message) a request for information in step 500. Security is discussed above in reference to FIG. 1A, and it is at least as important here. Along with the request, the user enters some authentication information. In step 502, the request and the authentication information are sent to the security system in the vehicle 100 by means of the cellular network 110. Upon receipt, the security system in step 504 attempts to verify the authentication information. There are many known ways to do this (examples are given above in reference to FIG. 1A), most of them involve comparing the sent authentication information with some information previously stored in the security system's RAM 210. If the received authentication information is successfully verified in step 506, then the requested information is gathered from the appropriate information-capture devices 106. For example, the owner may wish to view the inside of the vehicle 100 and asks that the camera 106 take and send a photograph. Note that the response need not be a one-time message: Upon request, the security system can set up a periodic or continual monitoring channel back to the requester. For example, a security officer may investigate a darkened building by requesting that a microphone transmit the sounds it is picking up. In any case, the requested information is transmitted to the authenticated requester (or to another contact) in step 508. If the authentication information cannot be verified, then the request is denied in step 510.

The system's ability to respond to a remote request opens other possibilities. The remote user can configure one of the information-capture devices 106, for example by moving the point-of-focus of a camera. Also, the remote user can send information to be displayed by the security system. This possibility was hinted at in the discussion accompanying FIG. 2. In the case of the vehicle 100, the remote owner may wish to speak to the driver or may display a warning or status update on a screen in the dashboard.

Figure 6:
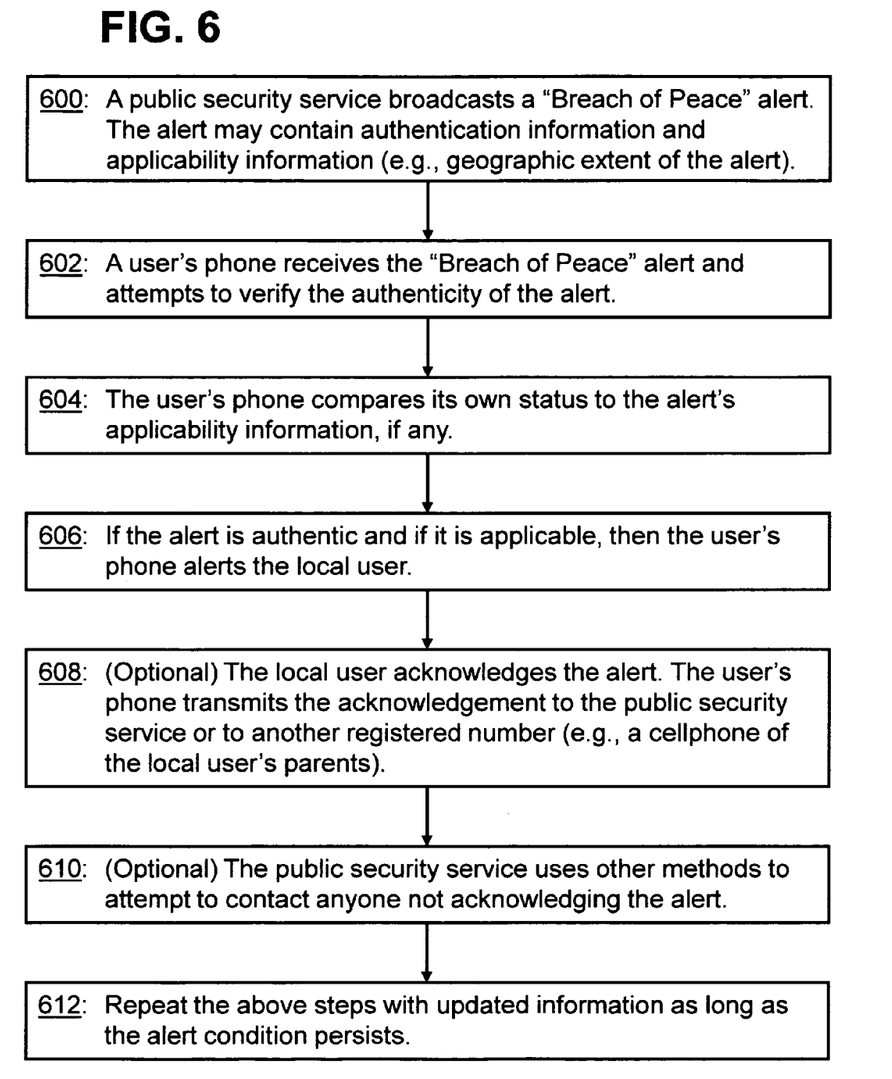
FIG. 6 is a flowchart showing a method for responding to a "Breach of Peace" alert.
Figure 7:
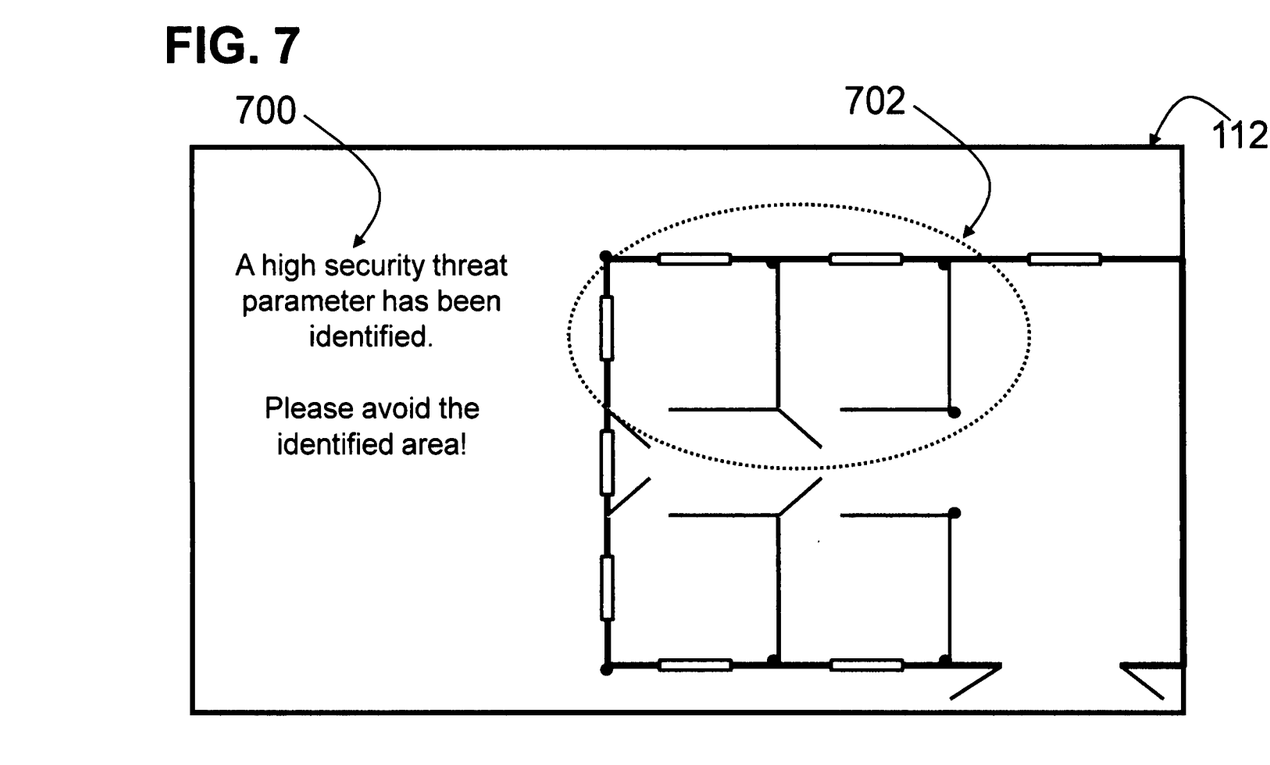
FIG. 7 is a screen shot of an exemplary Breach of Peace alert message.

A final feature of some embodiments of the present invention is illustrated by FIGS. 6 and 7. First, some background: A "breach of peace" is an alarming incident that involves all or many of the people in a given area. For example, nature can breach the peace by way of tornadoes, flooding, or even unusually high pollen counts. A large fire in a forest preserve or in a built-up area also constitutes a breach of peace. An overturned semi-truck can breach the peace by blocking a significant highway. Referring back to FIG. 3, a terrorist gunman can breach the peace by attacking people in and around the building 300. In all of these cases, the forces of public security wish to inform local people so that they can avoid or flee the affected area.

For example, in FIG. 3, the sensors 304 can include "decibel sensors" that trigger when they hear an unusually loud and sharp noise (like a gunshot). When the public security service analyses the alert carrying information from these sensors, it broadcasts a "breach of peace" alert to all people who may be affected. (See step 600 of FIG. 6.)

In one situation, the building 300 is a school building, and the public security service has a list of contact information for all registered students and employees of the school. The "breach of peace" alert is sent to all of these contacts. (In some embodiments, the security system itself analyzes the data provided by its sensors and itself sends out the "breach of peace" alert, also contacting a security service, of course.)

More so than with other types of alerts, a "breach of peace" alert should be widely broadcast to anyone who may potentially be affected by the incident. In keeping with this consideration, a "breach of peace" alert can also be sent to people who may be potentially affected but who are not registered on a contact list. To enable this, the entry sensor 308 of FIG. 3 records the devices that enter and leave the building 300 (or another area). When a "breach of peace" incident occurs, the alert can be sent to those devices detected as being present in the affected area, as well as to those registered on the contact list.

In some historic cases, "normal" communications channels (the public switched telephone network, the cellular networks, and even proprietary first-responder radio systems) were overwhelmed with emergency traffic and either dropped messages or crashed entirely. Thus, while these technologies could still be useful for sending out "breach of peace" alerts, alternative communications technologies should also be considered, where available, in an attempt to get the alert out as broadly as possible. Alternatives discussed above with reference to FIG. 1A include the Short-Messaging Service, text messaging, and satellite services. Short- and medium-range radio services such as WiFi, Bluetooth, and WiMAX can be used to send the alert to users' devices. Powerful transmitters in wireless access points can even send alerts to devices that are too far away to acknowledge receipt (because the transmitter in the user device is not strong enough to send a message back to the distant access point). Taking advantage of multiple communications technologies is especially important within large buildings, industrial complexes, or other places where cellular coverage is limited or non-existent.

In step 602, at least some of the people receive the "breach of peace" alert. To avoid malicious use of this feature, the alert should include authenticity information. Because some people might not be affected by some alert situations (e.g., they may not be sensitive to high pollen counts), the alert may be ignored by some recipients in step 604. If the alert is authentic, and if it applies to this particular person, then the recipient is informed in step 606. The recipient then takes appropriate action.

Note that as with other scenarios, the "breach of peace" alert can contain detailed information from the sensors and information-capture devices 304, 306. For example, the alert can describe the extent of flooding or give the exact locations of the sensors 304 that heard a gunshot. As the incident progresses, this information can change, and updates to the alert can be sent out in step 612. For example, the position of a terrorist can be tracked by the decibel sensors or by cameras or microphones. With updated alert information, innocent people can flee while security forces can gather quickly to the correct location to resolve the incident.

FIG. 7 gives an example of the type of information that can be included in the "breach of peace" alert. Displayed on a user's personal communications device 112 (e.g., on the display screen of a cellphone) is a textual description 700 of the incident and, if useful, a map. The map indicates the area of danger 702. If the location of the user is known by the system, then the map can display the user's current location and suggest a route to safety. Directions to safety may also be given by voice prompts.

The information illustrated in FIG. 7 may also be given to security forces responding to the incident. In some cases, these personnel may be given more detailed information, information which would not be helpful to fleeing bystanders or which should not be given to, for example, a terrorist causing the incident. As just one example, the map sent to security forces could include the locations of all security personnel so that they could coordinate their response. (For security's sake, it should be assumed that a terrorist has access to all alert information transmitted to bystanders.)

It is possible than some people will not receive a "breach of peace" alert directed to them. In order to deal with this possibility, recipients of the alert acknowledge their receipt in step 608. In step 610, the security service may compare the acknowledgements to the list of registered people and to a list of those people detected in the area and attempt to use other means to find those not responding. This ability is especially useful in fire and flood situations where it has traditionally been very difficult to know when everyone is out of harm's way.

Because of the urgent response required by a "breach of peace" alert, users' cellphones 112 (or whatever device they have to receive the alert) may be programmed to interrupt and to override other uses in order to more quickly display the alert.

In view of the many possible embodiments to which the principles of this invention may be applied, it should be recognized that the embodiments described herein with respect to the drawing figures are meant to be illustrative only and should not be taken as limiting the scope of the invention. For example, the invention may be used in other environments and may take advantage of communications and sensing technologies other than those illustrated. Therefore, the invention as described herein contemplates all such embodiments as may come within the scope of the following claims and equivalents thereof.

I claim:

1. A master alarm unit configured for use with an alarm system, the master alarm unit comprising:
   a first communications port for receiving an alert of a first type and for receiving entry-detection information from an entry sensor that controls and makes records of entrance;
   a second communications port for communicating with an information-capture module;
   a transmitter/receiver configured for transmitting an alert of a second type along with information received over the second communications port, the alert of a second type being sent to a device of everyone on said records of entrance identified by the entry-detection information;
   wherein the alert of a second type is a "Breach of Peace" alert; and
   wherein the transmitter/receiver is further configured for:
   transmitting response information to the device of everyone on said records of entrance identified by the entry-detection information.

2. A master alarm unit configured for use with an alarm system, the master alarm unit comprising:
   a first communications port for receiving an alert of a first type and for receiving entry-detection information;
   a second communications port for communicating with an information-capture module;
   a transmitter/receiver configured for transmitting an alert of a second type along with information received over the second communications port, the alert of a second type sent to a device identified by the entry-detection information; wherein the alert of a second type is a "Breach of Peace" alert;
   the master alarm unit being configured for:
   receiving a request to capture information;
   issuing a command over the second communications port to capture the requested information;

receiving the captured information over the second communications port; and transmitting the captured information.

3. The master alarm unit of claim 2 wherein the first and the second communications ports are selected from the group consisting of:

a wired serial port, a radio port, a Bluetooth port, a WiFi port, a USB port, and an infrared port.

4. The master alarm unit of claim 2 wherein the transmitter/receiver is selected from the group consisting of:

a radio transmitter/receiver, a cellular transmitter/receiver, a satellite transmitter/receiver, and a GSM transmitter/receiver.

5. The master alarm unit of claim 2 wherein the transmitter/receiver is configured for:

transmitting the alert of the second type using a communication technology selected from the group consisting of:

mobile telephony, Bluetooth, WiFi, WiMAX, short-range radio, and medium-range radio.

6. The master alarm unit of claim 2 further configured for:
receiving authentication information;
attempting to verify the received authentication information; and
responding to the request only if the authentication information is successfully verified.

7. The master alarm unit of claim 2 wherein the transmitter/receiver is further configured for:

transmitting response information to the device identified by the entry-detection information, wherein the response information is selected from the group consisting of:

a map based, at least in part, on the Breach of Peace alert, a suggested route to safety, and a current location of the device identified by the entry-detection information.

8. A method of operation of a master alarm unit configured for use with an alarm system, the method comprising the steps of receiving an alert of a first type;
receiving entry-detection information;

in response to receiving the alert of a first type, returning captured information;

transmitting an alarm of a second type along with the captured information;

sending the alarm of a second type to a device identified by the entry-detection information, wherein the alarm of a second type is a "Breach of Peace" alert;

receiving a request for returning the captured information;
capturing the requested captured information;
transmitting the captured information;
receiving authentication information;
attempting to verify the received authentication information; and
responding to the request only if the authentication information is successfully verified.

9. The method of operation of a master alarm unit of claim 8 further comprising:

receiving a request to configure an information-capture module; and issuing a configuration command to an information-capture module.

10. The method of operation of a master alarm unit of claim 8 further comprising:

repeatedly capturing an image and transmitting the captured images.

11. The method of operation of a master alarm unit of claim 8 further comprising:

continually capturing video images and transmitting the captured video images.

12. The method of operation of a master alarm unit of claim 8 further comprising:

transmitting response information to the device identified by the entry-detection information, wherein the response information is selected from the group consisting of:

a map based, at least in part, on the Breach of Peace alert, a suggested route to safety, and a current location of the device identified by the entry-detection information.

* * * * *